(12) United States Patent
Singh et al.

(10) Patent No.: US 11,736,166 B2
(45) Date of Patent: *Aug. 22, 2023

(54) SYSTEMS AND METHODS FOR MAPPING REMOTE ELECTRICAL TILT COMPONENTS AND ANTENNA PORTS OF A CELLULAR TOWER BASED ON RETURN LOSS ASSOCIATED WITH ANTENNAS OF THE CELLULAR TOWER

(71) Applicant: Verizon Patent and Licensing Inc., Basking Ridge, NJ (US)

(72) Inventors: Vikramjeet Singh, Elk Grove, CA (US); Jacob S. Lynch, Sacramento, CA (US); Corey B Shaffer, Waialua, HI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/304,261

(22) Filed: Jun. 17, 2021

(65) Prior Publication Data

US 2021/0399778 A1    Dec. 23, 2021

Related U.S. Application Data

(63) Continuation of application No. 16/904,235, filed on Jun. 17, 2020, now Pat. No. 11,050,475.

(51) Int. Cl.
*H04B 7/06* (2006.01)
*H04B 17/318* (2015.01)

(52) U.S. Cl.
CPC ........ *H04B 7/0617* (2013.01); *H04B 17/318* (2015.01)

(58) Field of Classification Search
CPC ............................ H04B 7/0617; H04B 17/318
See application file for complete search history.

(56) References Cited

U.S. PATENT DOCUMENTS

| | | | |
|---|---|---|---|
| 7,342,532 B1 | 3/2008 | Matsuoka | |
| 8,654,025 B1 | 2/2014 | Brock et al. | |
| 9,414,224 B1 * | 8/2016 | Schmidt | ................ H04W 12/02 |
| 2005/0024267 A1 | 2/2005 | Jouvie et al. | |
| 2010/0248659 A1 | 9/2010 | Kawabata | |
| 2015/0318610 A1 | 11/2015 | Lee et al. | |
| 2015/0381212 A1 | 12/2015 | Moon et al. | |
| 2020/0169009 A1 | 5/2020 | Kolitsidas et al. | |
| 2020/0313711 A1 * | 10/2020 | Patton | ....................... H03F 3/20 |

* cited by examiner

*Primary Examiner* — Junpeng Chen

(57) ABSTRACT

A device may cause a change for a plurality of remote electrical tilt components associated with a plurality of antennas of a base station. The device may receive a set of return loss values associated with the plurality of antennas and generate a plurality of sets of return loss values. The device may calculate statistical measures for return loss values of the plurality of sets of return loss values. The device may identify port identifiers for ports associated with the plurality of antennas based on comparing the statistical measures with a threshold. The device may generate a mapping of remote electrical tilt identifiers associated with the plurality of remote electrical tilt components and the port identifiers based on identifying the port identifiers. The device may cause the mapping to be implemented by the plurality of remote electrical tilt components and the ports associated with the plurality of antennas.

20 Claims, 12 Drawing Sheets

SYSTEMS AND METHODS FOR MAPPING REMOTE ELECTRICAL TILT COMPONENTS AND ANTENNA PORTS OF A CELLULAR TOWER BASED ON RETURN LOSS ASSOCIATED WITH ANTENNAS OF THE CELLULAR TOWER

RELATED APPLICATION

This application is a continuation of U.S. patent application Ser. No. 16/904,235, entitled "SYSTEMS AND METHODS FOR MAPPING REMOTE ELECTRICAL TILT COMPONENTS AND ANTENNA PORTS OF A CELLULAR TOWER BASED ON RETURN LOSS ASSOCIATED WITH ANTENNAS OF THE CELLULAR TOWER," filed Jun. 17, 2020 (now U.S. Pat. No. 11,050,475), which is incorporated herein by reference in its entirety.

BACKGROUND

Cellular towers typically support multiple antennas. Beam tilt refers to aiming a beam emitted from an antenna at a tilt angle with respect to a horizontal plane. Beam tilt adjustment is used in cellular networks to reduce signal propagation between cell sites in order to reduce signal interference and increase network capacity. The tilt angle of a beam emitted from an antenna can be set or adjust by mechanical tilt and/or electrical tilt. Mechanical tilt refers to physically tilting an antenna. Electrical tilt does not involve physical movement of the antenna, but instead changing phases between radiating elements inside an antenna to change the radiation pattern of the antenna and cause a beam emitted from the antenna to tilt downward or upward. Remote Electrical Tilt (RET) is a feature found in cellular tower antennas that allows electrical tilt angles of the antennas to be controlled remotely by applying phase delays to transmission paths of the antennas.

DETAILED DESCRIPTION OF PREFERRED EMBODIMENTS

Figure 1A:
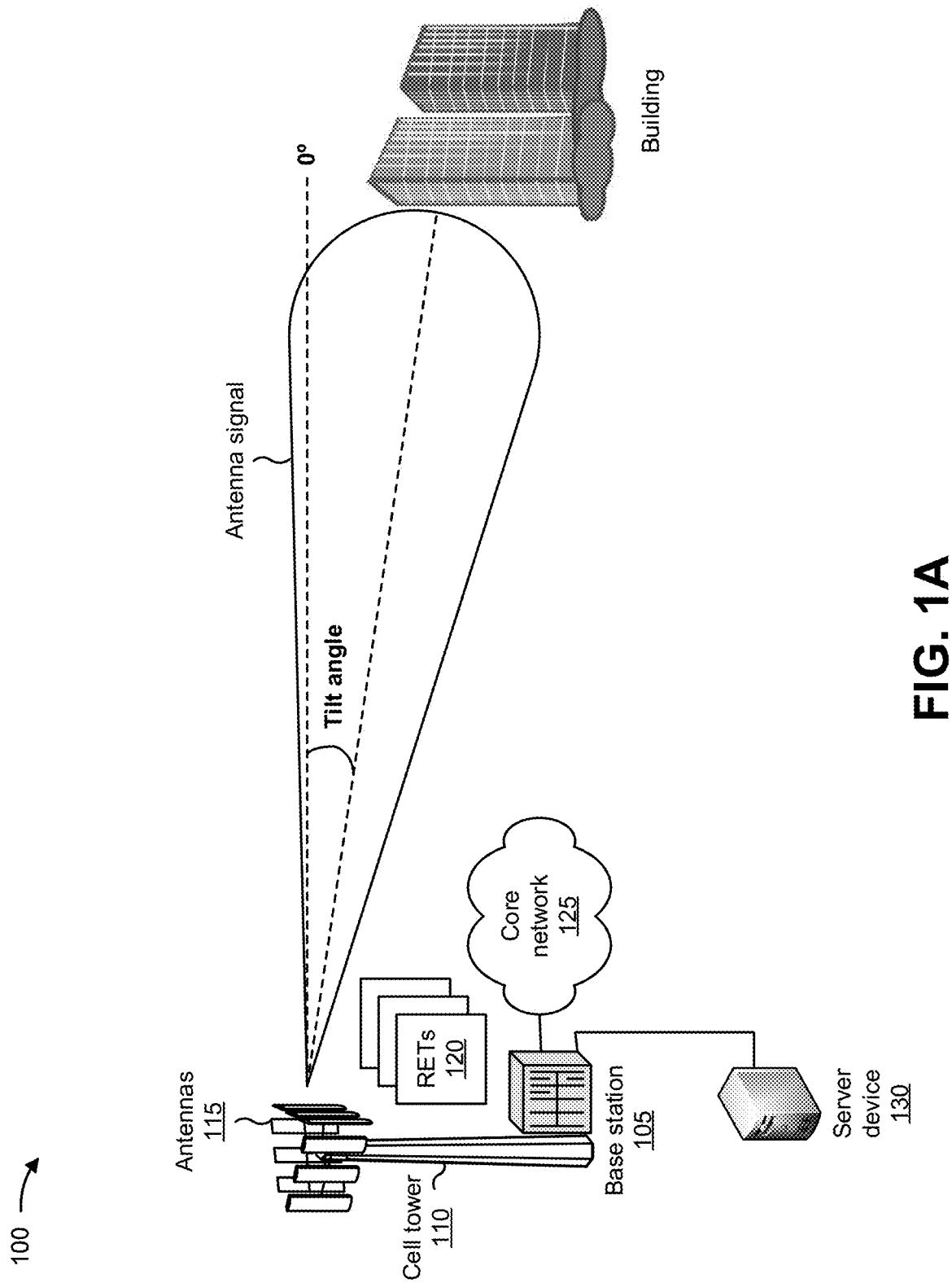
FIGS. 1A-1H are diagrams of an example implementation described herein.

The following detailed description of example implementations refers to the accompanying drawings. The same reference numbers in different drawings may identify the same or similar elements.

Remote Electrical Tilt (RET) is a feature found in antennas of cellular towers that allows an electrical tilt angle of an antenna to be controlled remotely by changing phases between radiating elements inside the antenna. By using RET, the electrical tilt angle of an antenna may be adjusted remotely without the need for a technician to climb the cellular tower. RET may be used for optimization of a wireless network, such as a radio access network (RAN), cellular network, and/or the like.

A cell site with a base station and a cellular tower supporting multiple antennas may have multiple RET components. An RET component may control the electrical tilt angle of one or more antennas respectively associated with one or more antenna ports. In order for optimization of a wireless network using the RET components to be effective, it is useful to accurately associate the RET components with the antenna ports controlled by the RET components. Incorrect identification of which antenna ports are controlled by which RET components may result in poor optimization of the wireless network, up to and including complete loss of coverage.

Each RET component has a unique serial number. Associations between the RET components and antenna ports of a cellular tower may be determined manually. For example, an installer of the RET components may record the serial numbers of the RET components that control the antenna ports and may communicate the associations between the RET component serial numbers and the antenna ports to an RET programmer via a document. The RET programmer may rely on the associations in the document to program RETs in the wireless network. This process is prone to human error and often results in inaccurate associations of RET components and antenna ports.

Optimizing the wireless network using RETs may not be effective or possible if the RET components, which control the antenna ports, are not correctly identified. For example, to optimize network coverage of a cell using RETs, it is useful to correctly map an antenna port associated with that cell to the RET component that controls that antenna port so that a base station can control the correct RET component to assign or modify the electrical tilt for a specific transmitter associated with that antenna port. Currently, this involves strong communication between the RET integration team and the RET installer and accuracy of the installer in communicating the correct information. Any inaccuracies in this manual process may cause the optimization of the wireless network to be ineffective, which may lead to inferior performance of the wireless network, including incomplete, reduced, or sporadic network coverage and reduced network speed. Furthermore, it is difficult to tell if the associations between the RET components and the antenna ports provided by the RET installer are correct prior to relying on the associations to perform optimization of the wireless network. Implementing optimization of the wireless network with incorrect associations between the RET components and the antenna ports consumes computing resources (e.g., processing resources, memory resources, communication resources, and/or the like), networking resources, and/or the like, as the incorrect associations between the RET components and the antenna ports will have to be identified and corrected, and the network optimization will have to be repeated once the associations between the RET components and the antenna ports are corrected.

Some implementations described herein enable a device to automatically generate a mapping of RET components and antenna ports of a cellular tower using a relationship between return loss and electrical tilt. The device may cause each RET component to change the electrical tilt controlled by that RET component. Changing the electrical tilt of an antenna changes the return loss. Return loss is a property of an antenna that can be measured and accurately mapped to the port associated with that antenna. The device may receive sets of return loss values associated with the antennas based on the changes to the electrical tilt controlled by each RET component. The device may automatically generate a mapping of RET identifiers associated with the RET components and port identifiers for the ports associated with the antennas based on the sets of return loss values. The device may cause the mapping to be implemented by the RET components and the ports associated with the antennas.

In this way, by generating a mapping between the RET components and the ports associated with the antennas based on the relationship between return loss and electrical tilt, the accuracy of this mapping is improved. As a result, the reliability and effectiveness of RET-based network optimization using this mapping is increased, leading to increased network coverage, network reliability, and network speed. Furthermore, by generating a mapping between the RET components and the ports associated with the antennas based on the relationship between return loss and electrical tilt prior to performing RET-based network optimization, some implementations reduce the risk of having to repeat network optimizations due to the use of an incorrect mapping between the RET components and the ports associated with the antennas. Thus, computing resources, networking resources, and/or the like that would otherwise have been consumed to identify incorrect associations between the RET components and the ports associated with the antennas, correct the incorrect associations, and repeat network optimizations are conserved. In addition, as a result of automatically generating a mapping between the RET components and ports associated the antennas, some implementations eliminate the time and cost used for RET integration and RET installation teams to manually create such a mapping.

FIGS. 1A-1H are diagrams of an example implementation 100 described herein. Example implementation 100 may be associated with mapping RET components and antenna ports of a cellular tower based on return loss associated with antennas of the cellular tower. As shown in FIGS. 1A-1H, example implementation 100 includes a base station 105, cellular tower 110, antennas 115, RET components 120, a core network 125, and a server device 130.

As shown in FIG. 1A, the RET components 120 may adjust electrical tilt angles of the antennas 115. The RET components 120 may be controlled by the base station 105, the server device 130, and/or another device to adjust the electrical tilt angles of the antennas 115 without a human having to climb the cellular tower 110. As shown in FIG. 1A, the electrical tilt angle of an antenna 115 may be adjusted by at least one of the RET components 120 to transmit an antenna signal from the antenna 115 at a downward tilt angle with respect to a horizontal plane in order to aim the antenna signal at a building and improve wireless network coverage for the building.

Figure 1B:
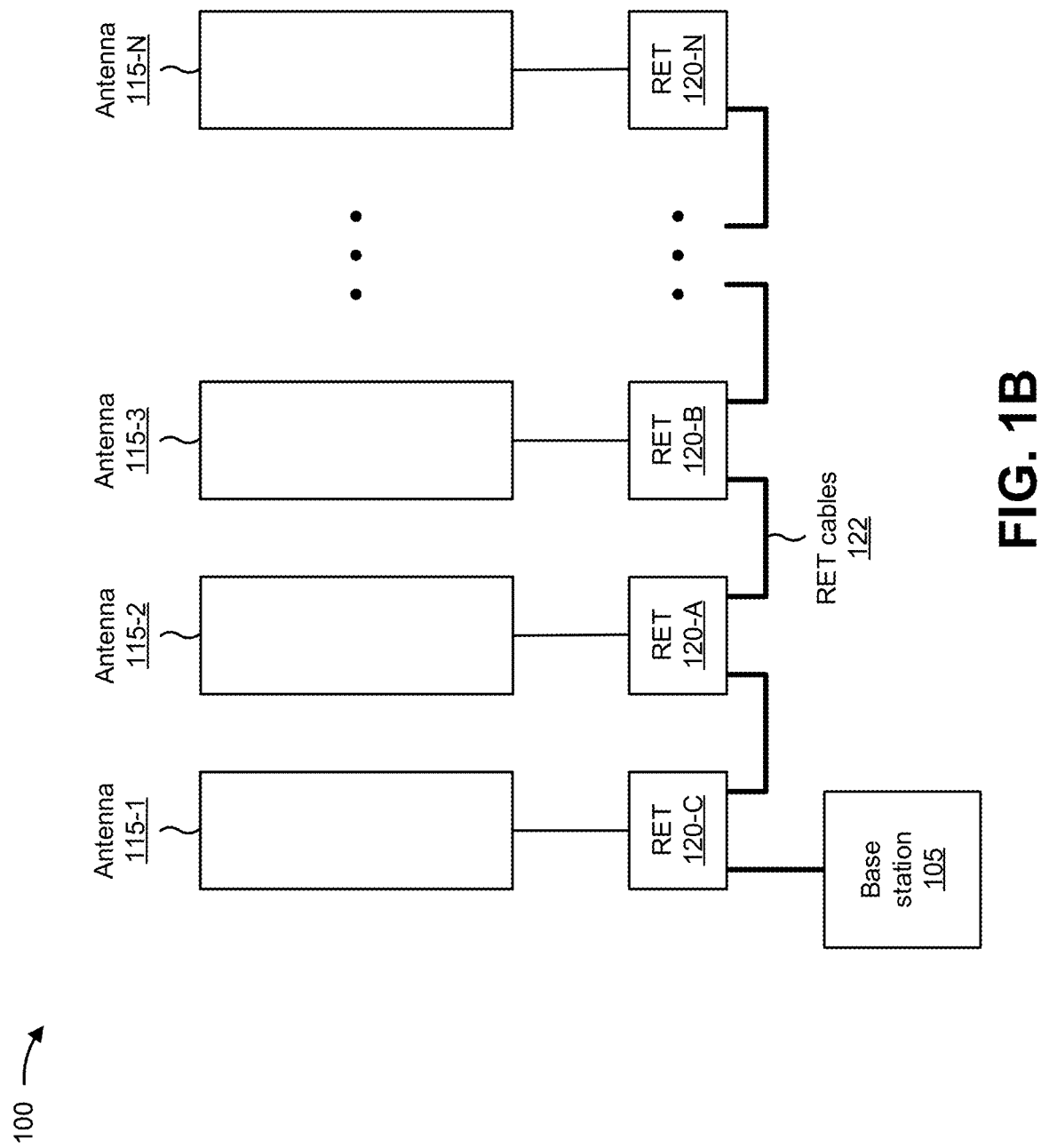

As shown in FIG. 1B, assume that the antennas 115 include a plurality of antennas 115-1, 115-2, 115-3, . . . 115-N and the RET components 120 include a plurality of RET components 120-A, 120-B, 120-C, . . . , 120-N. In this example, each of the RET components 120 is configured to control the electrical tilt angle of a respective one of the antennas 115. For example, RET component 120-C is configured to control the electrical tilt angle of antenna 115-1, RET component 120-A is configured to control the electrical tilt angle of antenna 115-2, and RET component 120-B is configured to control the electrical tilt angle of antenna 115-3. In another example, a single RET component 120 may be configured to control the electrical tilt angles associated with two or more of the antennas 115.

The RET components 120 may be electrically coupled to each other by RET cables 122 in a daisy chain configuration. For example, the RET cables 122 may be Antenna Interface Standards Group (ASIG) control cables. The RET cables 122 may also connect the RET components 120 to an RET controller, which may be integrated with or connected to the base station 105. The antennas 115 may be variable electrical tilt (VET) antennas that are equipped with electrical phase shifter modules that set the electrical tilt angles for the antenna signals transmitted from the antennas 115. The RET components 120 may be remote control units (RCUs) connected to the respective antennas 115 and equipped with actuators and/or motors configured to engage with the phase shifter modules on the respective antennas 115 to adjust the electrical tilts of the respective antennas 115 in response to a control signal received from the RET controller via the RET cables 122. Each of the RET components 120 may be associated with a respective unique remote electrical tilt identifier, such as a serial number. Each of the antennas 115 may be associated with a respective antenna port having a respective antenna port identifier. The antenna ports may provide radio frequency (RF) paths between transmitters in the base station 105 and the antennas 115.

Figure 1C:
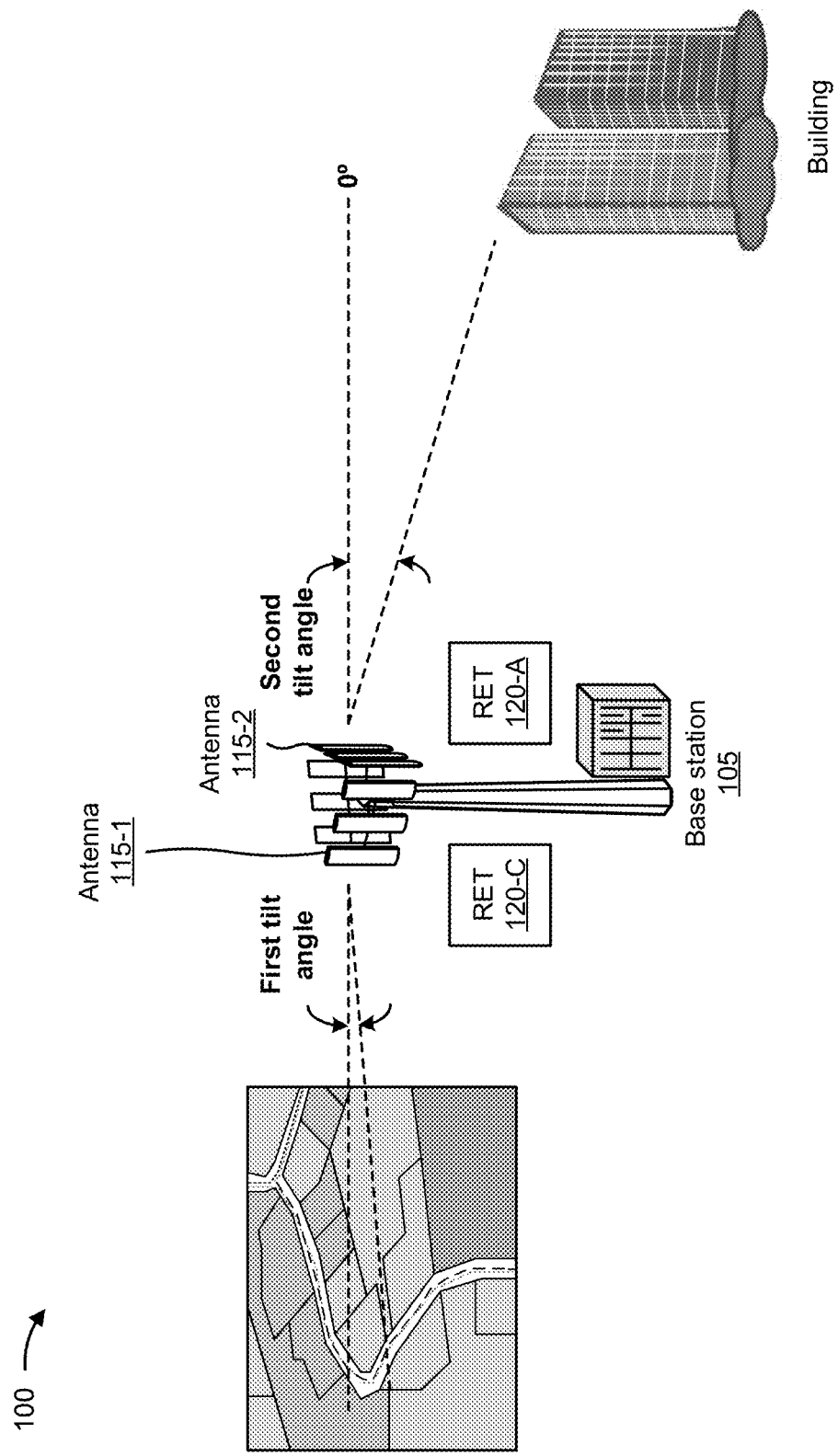

As shown in FIG. 1C, the RET components 120 may independently control the electrical tilt angles of the respective antennas 115. In this example, antenna 115-1 faces a highway and antenna 115-2 faces a building. RET component 120-C controls the electrical tilt angle of antenna 115-1 to transmit a first antenna signal at a first tilt angle in order to optimize wireless network coverage for a portion of the highway. RET component 120-A controls the electrical tilt angle of antenna 115-2 to transmit a second antenna signal at a second tilt angle in order to optimize wireless network coverage for the building.

It is useful to correctly identify which RET components 120 control which antennas 115. Incorrect identification of which RET components 120 control which antennas 115 may result in poor optimization of the wireless network. For instance, in the example shown in FIG. 1C, if RET component 120-A is incorrectly identified as controlling antenna 115-1, the first tilt angle intended for antenna 115-1 may instead be applied to antenna 115-2 by RET component 120-A. Since the first tilt angle is intended to optimize the wireless network coverage for the highway, transmitting the second antenna signal by antenna 115-2 at the first tilt angle instead of the second tilt angle may result in decreased and/or a complete loss of wireless network coverage for the building. This may also cause decreased wireless network coverage for the highway, as antenna 115-1 may be controlled to transmit the first antenna signal at a tilt angle other than the first tilt angle.

Figure 1D:
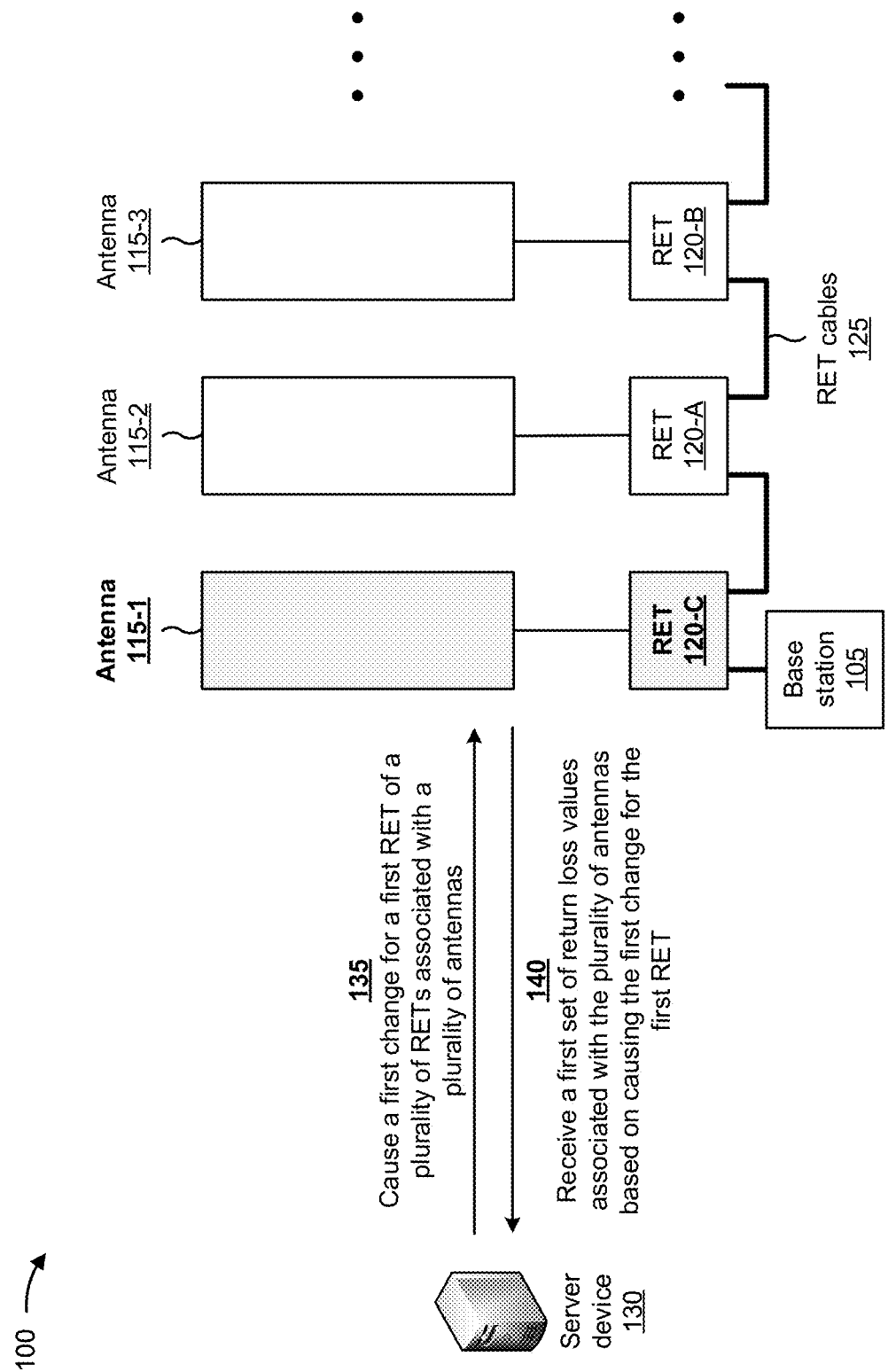

As shown in FIG. 1D, and by reference number 135, the server device 130 may cause a first change for a first RET component 120-C of the plurality of RET components 120 associated with the plurality of antennas 115. The server device 130 may cause the first change in the first RET component 120-C by sending instructions to the base station 105 to control the first RET component 120-C to adjust the electrical tilt controlled by the first RET component 120-C to a plurality of different tilt angles.

In some implementations, the server device 130 may cause the first RET component 120-C to incrementally change the electrical tilt to a plurality of tilt angles within a range of possible tilt values associated with the first RET component 120-C. For example, the server device 130 may cause the first RET component 120-C to incrementally change the electrical tilt of antenna 115-1 from a minimum tilt angle associated with the first RET component 120-C to a maximum tilt angle associated with the first RET component 120-C. In some implementations, the server device 130 may cause the first RET component 120-C to incrementally change the electrical tilt by a one degree increment. Additionally, and/or alternatively, a smaller or larger increment may be used to cause the first RET component 120-C to change the electrical tilt to more or fewer different tilt angles within the range of possible tilt angles. The range of possible tilt angles may be a full range of tilt angles from the minimum tilt angle associated with the first RET component 120-C to the maximum tilt angle associated with the first RET component 120-C, or may be any other range of possible tilt values (e.g., a proper subset of possible tilt values in the full range of tilt angles) associated with the first RET component 120-C. In some implementations, the server device 130 may cause the first RET component 120-C to change the electrical tilt from the minimum tilt angle to the maximum tilt angle, such the plurality of tilt angles includes the minimum tilt angle and the maximum tilt angle.

As further shown in FIG. 1D, and by reference number 140, the server device 130 may receive a first set of return loss values associated with the plurality of antennas 115 based on causing the first change for the first RET component 120-C. Return loss of an antenna 115 is a measurement of a proportion of radio waves arriving at an antenna port of the antenna 115 that are rejected as a ratio against the radio waves arriving at the antenna port of the antenna 115 that are accepted. Changing the electrical tilt of an antenna 115 changes the return loss of the antenna 115. The first set of return loss values may include return loss values for all of the antennas 115 measured for a plurality of different tilt angles associated with the first RET component 120-C.

In some implementations, in response to the server device 130 causing the first RET component 120-C to adjust the electrical tilt controlled by the first RET component 120-C to a plurality of different tilt angles, return loss values for all of the antennas 115 may be measured at the base station 105 for each of the plurality of different tilt angles of the electrical tilt controlled by the first RET component 120-C. For example, each time the first RET component 120-C is caused by the server device 130 to change the electrical tilt controlled by the first RET component 120-C, the base station 105 may sample return loss measurements on all of the antenna ports.

The first set of return loss values associated with the plurality of antennas 115 may be received by the server device 130 from the base station 105. In some implementations, the first set of return loss values may be received by the server device 130 in multiple transmissions from the base station 105. For example, in response to each time the first RET component 120-C is caused by the server device 130 to change the electrical tilt controlled by the first RET component 120-C, the base station 105 may measure the return loss values for all of the antennas 115 and transmit the return loss values for all of the antennas 115. This may result in the server device 130 receiving a respective transmission of return loss values for the antennas 115 in response to each change in the electrical tilt controlled by the first RET component 120-C. In this case, information received by the server device 130 in each transmission may include the antenna port identifiers and corresponding return loss measurements for the antenna ports.

In some implementations, the first set of return loss values may be received by the server device 130 in a transmission including the return loss values measured for all of the antennas 115 for two or more (or all) of the plurality of different tilt angles associated with the first RET component 120-C. For example, the base station 105 may measure and store the return loss values for all of the antennas 115 in response to each change in the electrical tilt controlled by the first RET component 120-C. Once the electrical tilt controlled by the first RET component 120-C is changed to two or more (or all) of the plurality of different tilt angles, the base station 105 may send the first set of return loss values including the return loss values for all of the antennas 115 for the two or more (or all) of the plurality of different tilt angles associated with the first RET component 120-C. In this case, information received by the server device 130 in the transmission may include the antenna port identifiers and corresponding return loss measurements for the antenna ports for the two or more (or all) of the plurality of tilt angles associated with the first RET component 120-C.

Figure 1E:
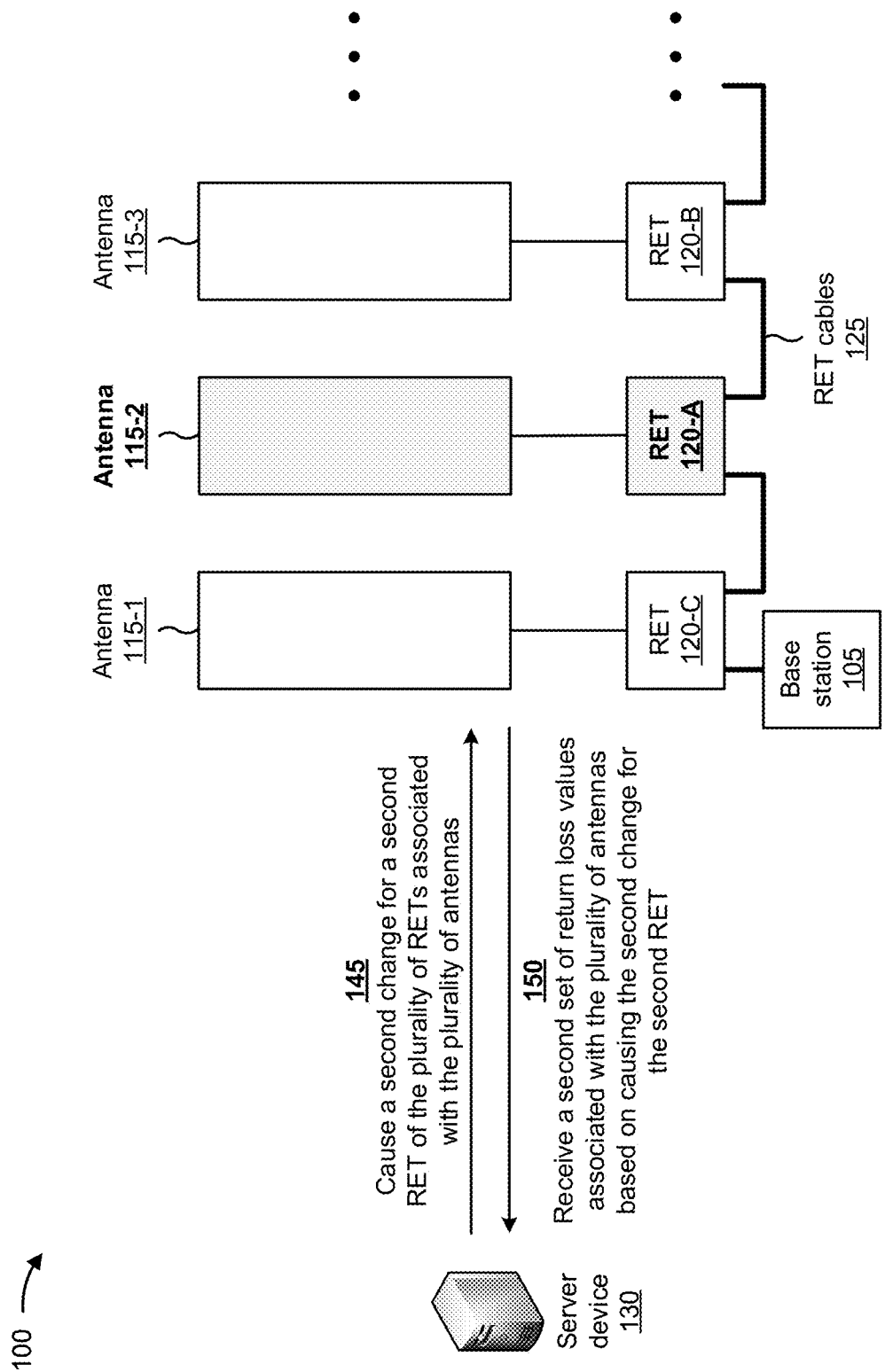

As shown in FIG. 1E, and by reference number 145, the server device 130 may cause a second change for a second RET component 120-A of the plurality of RET components 120 associated with the plurality of antennas 115. The server device 130 may cause the second change in the second RET component 120-A by sending instructions to the base station 105 to control the second RET component 120-A to adjust the electrical tilt controlled by the second RET component 120-A to a plurality of different tilt angles.

In some implementations, the server device 130 may cause the second RET component 120-A to incrementally change the electrical tilt to a plurality of tilt angles within a range of possible tilt values associated with the second RET component 120-A. For example, the server device 130 may cause the second RET component 120-A to incrementally change the electrical tilt of antenna 115-2 from a minimum tilt angle associated with the second RET component 120-A to a maximum tilt angle associated with the second RET component 120-A. In some implementations, the server device 130 may cause the second RET component 120-A to incrementally change the electrical tilt by a one degree increment. Additionally, and/or alternatively, a smaller or larger increment may be used to cause the second RET component 120-A to change the electrical tilt to more or fewer different tilt angles within the range of possible tilt angles. The range of possible tilt angles may be a full range of tilt angles from the minimum tilt angle associated with the second RET component 120-A to the maximum tilt angle associated with the second RET component 120-A, or may be any other range of possible tilt values (e.g., a proper subset of possible tilt values in the full range of tilt angles) associated with the second RET component 120-A. In some implementations, the server device 130 may cause the second RET component 120-A to change the electrical tilt from the minimum tilt angle to the maximum tilt angle, such the plurality of tilt angles includes the minimum tilt angle and the maximum tilt angle.

As further shown in FIG. 1E, and by reference number 150, the server device 130 may receive a second set of return loss values associated with the plurality of antennas 115 based on causing the second change for the second RET component 120-A. The second set of return loss values may include return loss values for all of the antennas 115 measured for a plurality of different tilt angles associated with the second RET component 120-A.

In some implementations, in response to the server device 130 causing the second RET component 120-A to adjust the electrical tilt controlled by the second RET component 120-A to a plurality of different tilt angles, return loss values for all of the antennas 115 may be measured at the base station 105 for each of the plurality of different tilt angles of the electrical tilt controlled by the second RET component 120-A. For example, each time the second RET component 120-A is caused by the server device 130 to change the electrical tilt controlled by the second RET component 120-A, the base station 105 may sample return loss measurements on all of the antenna ports.

The second set of return loss values associated with the plurality of antennas 115 may be received by the server device 130 from the base station 105. In some implementations, the second set of return loss values may be received by the server device 130 in multiple transmissions from the base station 105. For example, in response to each time the second RET component 120-A is caused by the server device 130 to change the electrical tilt controlled by the second RET component 120-A, the base station 105 may measure the return loss values for all of the antennas 115 and transmit the return loss values for all of the antennas 115. This may result in the server device 130 receiving a respective transmission of return loss values for the antennas 115 in response to each change in the electrical tilt controlled by the second RET component 120-A. In this case, information received by the server device 130 in each transmission may include the antenna port identifiers and corresponding return loss measurements for the antenna ports.

In some implementations, the second set of return loss values may be received by the server device 130 in a transmission including the return loss values measured for all of the antennas 115 for two or more (or all) of the plurality of different tilt angles associated with the second RET component 120-A. For example, the base station 105 may measure and store the return loss values for all of the antennas 115 in response to each change in the electrical tilt controlled by the second RET component 120-A. Once the electrical tilt controlled by the second RET component 120-A is changed to two or more (or all) of the plurality of different tilt angles, the base station 105 may send the second set of return loss values including the return loss values for all of the antennas 115 for the two or more (or all) of the plurality of different tilt angles associated with the second RET component 120-A. In this case, information received by the server device 130 in the transmission may include the antenna port identifiers and corresponding return loss measurements for the antenna ports for the two or more (or all) of the plurality of tilt angles associated with the second RET component 120-A.

Figure 1F:
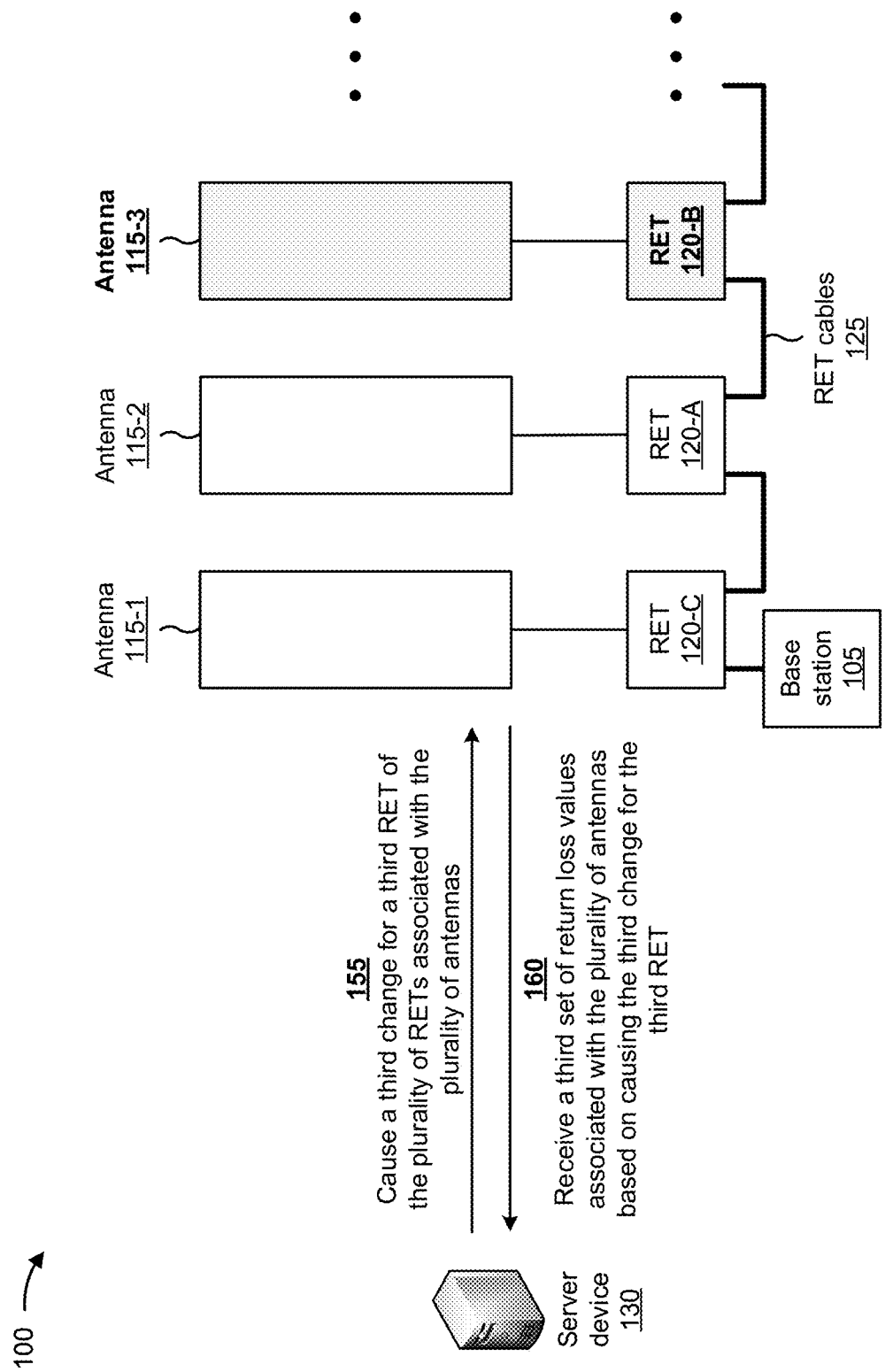

As shown in FIG. 1F, and by reference number 155, the server device 130 may cause a third change for a third RET component 120-B of the plurality of RET components 120 associated with the plurality of antennas 115. The server device 130 may cause the third change in the third RET component 120-B by sending instructions to the base station 105 to control the third RET component 120-B to adjust the electrical tilt controlled by the third RET component 120-B to a plurality of different tilt angles.

In some implementations, the server device 130 may cause the third RET component 120-B to incrementally change the electrical tilt to a plurality of tilt angles within a range of possible tilt values associated with the third RET component 120-B. For example, the server device 130 may cause the third RET component 120-B to incrementally change the electrical tilt of antenna 115-3 from a minimum tilt angle associated with the third RET component 120-B to a maximum tilt angle associated with the third RET component 120-B. In some implementations, the server device 130 may cause the third RET component 120-B to incre-
mentally change the electrical tilt by a one degree increment. Additionally, and/or alternatively, a smaller or larger increment may be used to cause the third RET component 120-B to change the electrical tilt to more or fewer different tilt angles within the range of possible tilt angles. The range of possible tilt angles may be a full range of tilt angles from the minimum tilt angle associated with the third RET component 120-B to the maximum tilt angle associated with the third RET component 120-B, or may be any other range of possible tilt values (e.g., a proper subset of possible tilt values in the full range of tilt angles) associated with the third RET component 120-B. In some implementations, the server device 130 may cause the third RET component 120-B to change the electrical tilt from the minimum tilt angle to the maximum tilt angle, such the plurality of tilt angles includes the minimum tilt angle and the maximum tilt angle.

As further shown in FIG. 1F, and by reference number 160, the server device 130 may receive a third set of return loss values associated with the plurality of antennas 115 based on causing the third change for the third RET component 120-B. The third set of return loss values may include return loss values for all of the antennas 115 measured for a plurality of different tilt angles associated with the third RET component 120-B.

In some implementations, in response to the server device 130 causing the third RET component 120-B to adjust the electrical tilt controlled by the third RET component 120-B to a plurality of different tilt angles, return loss values for all of the antennas 115 may be measured at the base station 105 for each of the plurality of different tilt angles of the electrical tilt controlled by the third RET component 120-B. For example, each time the third RET component 120-B is caused by the server device 130 to change the electrical tilt controlled by the third RET component 120-B, the base station 105 may sample return loss measurements on all of the antenna ports.

The third set of return loss values associated with the plurality of antennas 115 may be received by the server device 130 from the base station 105. In some implementations, the third set of return loss values may be received by the server device 130 in multiple transmissions from the base station 105. For example, in response to each time the third RET component 120-B is caused by the server device 130 to change the electrical tilt controlled by the third RET component 120-B, the base station 105 may measure the return loss values for all of the antennas 115 and transmit the return loss values for all of the antennas 115. This may result in the server device 130 receiving a respective transmission of return loss values for the antennas 115 in response to each change in the electrical tilt controlled by the third RET component 120-B. In this case, information received by the server device 130 in each transmission may include the antenna port identifiers and corresponding return loss measurements for the antenna ports.

In some implementations, the third set of return loss values may be received by the server device 130 in a transmission including the return loss values measured for all of the antennas 115 for two or more (or all) of the plurality of different tilt angles associated with the third RET component 120-B. For example, the base station 105 may measure and store the return loss values for all of the antennas 115 in response to each change in the electrical tilt controlled by the third RET component 120-B. Once the electrical tilt controlled by the third RET component 120-B is changed to two or more (or all) of the plurality of different tilt angles, the base station 105 may send the third set of return loss values including the return loss values for all of the antennas 115 for the two or more (or all) of the plurality of different tilt angles associated with the third RET component 120-B. In this case, information received by the server device 130 in the transmission may include the antenna port identifiers and corresponding return loss measurements for the antenna ports for the two or more (or all) of the plurality of tilt angles associated with the third RET component 120-B.

The server device 130 may then sequentially cause a respective change for each remaining RET component 120 in the plurality of RET components 120-A, 120-B, 120-C, . . . 120-N and receive a respective set of return loss values associated with the plurality of antennas 115 based on causing the change for each remaining RET component 120 in the plurality of RET components 120-A, 120-B, 120-C, . . . 120-N. This may result in generating a plurality of sets of return loss values in which each set of return loss values corresponds to a respective RET component 120. For example, for each remaining RET component 120 in the plurality of RET components 120-A, 120-B, 120-C, . . . 120-N, the server device 130 may send instructions to the base station 105 to cause that RET component 120 to adjust the electrical tilt controlled by that RET component 120 to a plurality of different tilt angles, and receive from the base station 105 a set of return loss values that includes return loss values for all of the antennas 115 measured for all of the plurality of different tilt angles associated with that RET component 120.

Figure 1G:
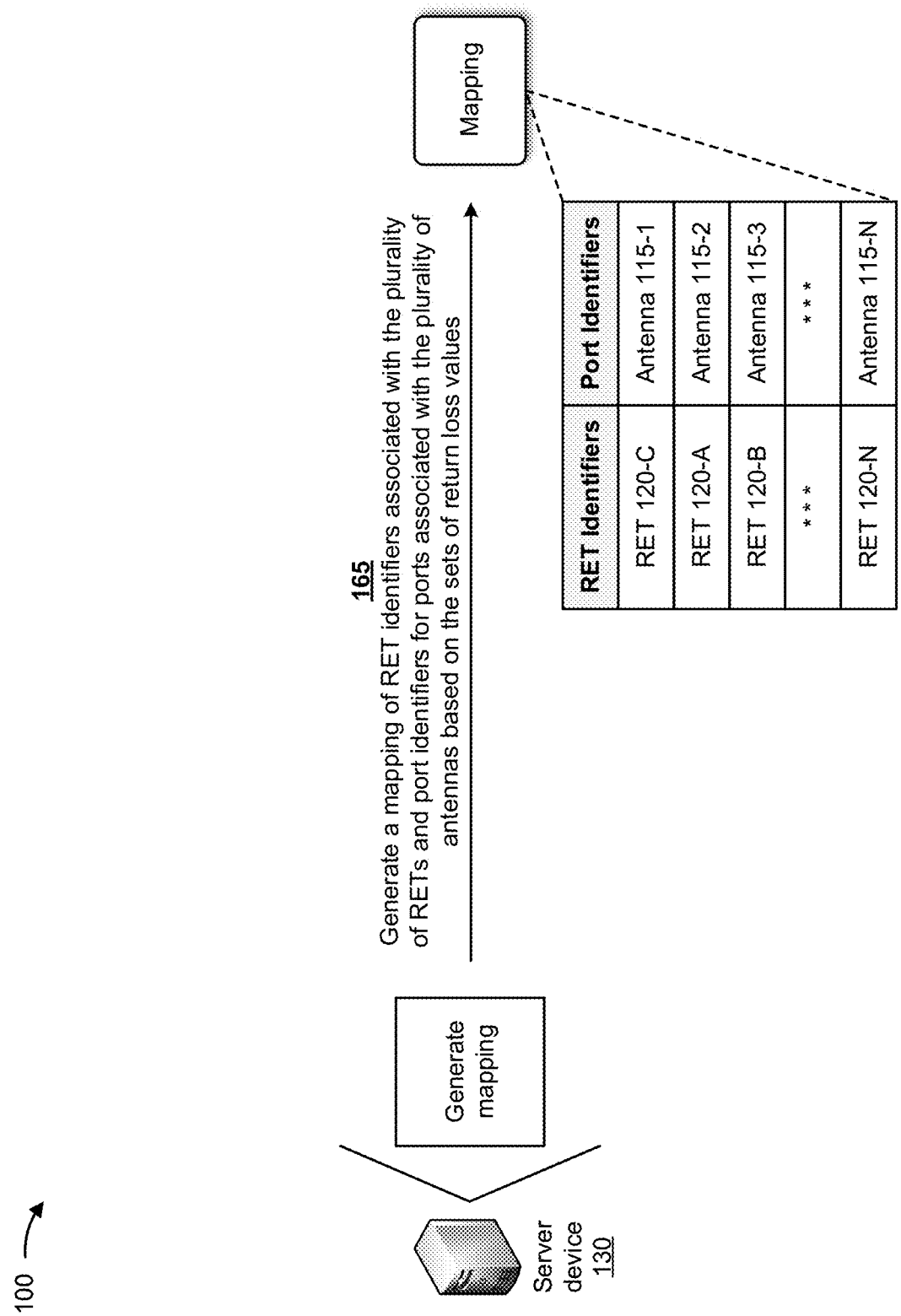

As shown in FIG. 1G, and by reference number 165, the server device 130 may generate a mapping of RET identifiers associated with the plurality of RET components 120 and port identifiers for the antenna ports associated with the plurality of antennas 115 based on the sets of return loss values. The server device 130 may calculate standard deviations for the return loss values of the plurality of sets of return loss values, may identify antenna port identifiers for one or more antenna ports associated with one or more antennas 115 affected by changes in the electrical tilt angle controlled by each of the plurality of RET components 120 based on the standard deviations, and generate the mapping of the RET identifiers and the port identifiers based on the port identifiers identified for each of the plurality of RET components 120.

In some implementations, the server device 130 may generate the mapping of RET identifiers associated with the plurality of RET components 120 and port identifiers for the antenna ports associated with the plurality of antennas 115 by independently mapping the respective RET identifier for each RET component 120 to one or more port identifiers for antenna ports associated with antennas 115 controlled by that RET component 120 based on the return loss values in the respective set of return loss values corresponding to that RET component 120. The independent mapping off the RET identifiers and the port identifiers for the plurality of RET components 120 may be performed by the server device 130 sequentially, in parallel, or a combination thereof. The mapping of the RET identifier for an RET component 120 to one or more port identifiers by the server device 130 is described herein. It is to be understood that the server device 130 may similarly perform such a mapping for each RET component 120 of the plurality of RET components 120-A, 120-B, 120-C, . . . , 120-N.

In order to map the RET identifier for an RET component 120 to one or more port identifiers for antenna ports associated with antennas 115 controlled by that RET component 120, the server device 130 may calculate standard deviations for the return loss values associated with the antenna ports in the respective set of return loss values corresponding to that RET component 120. The set of return loss values may include, for each antenna port, a plurality of return loss values for that antenna port associated with a plurality of different tilt angles of the electrical tilt controlled by the RET component 120. The server device 130 may calculate, for each antenna port, a standard deviation of the plurality of return loss values for that antenna port. In some implementations, the server device 130 may store the return loss values for the antenna ports, the port identifiers associated with the antenna ports, and the RET identifier associated with the RET component 120 in a log file. The server device 130 may read the return loss values associated with the port identifiers from the log file and calculate the respective standard deviation for each of the antenna ports based on the return loss values associated with the respective port identifier for each of the antenna ports. In some implementations, one or more other statistical measure relating to the return loss values may be calculated by the server device 130 in addition to and/or instead of standard deviation.

The server device 130 may flag one or more antenna ports affected by the RET component 120 based on the standard deviations calculated for the antenna ports. The server device 130 may identify any antenna port having a standard deviation that satisfies a threshold as an antenna port affected by the RET component 120. For example, the threshold may be a standard deviation value of one. If no antenna ports have a standard deviation that satisfies the threshold, the server device 130 may determine that the RET component 120 is not is use and assign a label of "not in use" or "spare" to the RET component 120. In some implementations, the server device 130 may calculate a maximum standard deviation (MSD) of the standard deviations calculated for the antenna ports for the RET component 120. The server device 130 may compare the MSD for the RET component 120 with the threshold, and if the MSD for the RET component 120 does not satisfy the threshold, the server device 130 may determine that the RET component 120 is not in use.

The server device 130 may map the port identifiers of all or a subset of the identified antenna ports to the RET identifier of the RET component 120. In some implementations, the server device 130 may assign a cell identifier to the RET component 120 based on the identified antenna ports. Cell identifiers correspond to geographical cells to which wireless network service is provided by the base station 105. A cell may have 1, 2, or 4 antenna ports assigned to provide service to the cell. Accordingly, a cell identifier may have 1, 2, or 4 port identifiers assigned to that cell identifier. The RET component 120 may control electrical tilt on antenna ports associated with a single cell identifier or may control electrical tilts on antenna ports associated with multiple cell identifiers if the cell identifiers correspond to frequency bands that can be diplexed.

The server device 130 may assign scores for the RET component 120 to one or more cell identifiers based on the identified antenna ports for the RET component 120, assign one or more cell identifiers to the RET component 120 based on the scores assigned to the cell identifiers, and generate a mapping of port identifiers to the RET identifier of the RET component 120 based on the cell identifier assigned to the RET component 120. In this way, the server device 130 can ensure that antenna ports mapped to the RET component 120 are associated with the same cell identifier or associated with cell identifiers with frequency bands that can be shared by the same RET component 120. This increases the accuracy of the mapping of RET identifiers and port identifiers and corrects for noise or false positives in the return loss measurements.

The server device 130 may assign a score for the RET component 120 to each cell identifier associated with one or more of the identified antenna ports. The score for a cell identifier is a measure of the likelihood that the cell identifier is associated with a particular RET component 120. The score for a cell identifier may be assigned based on an MSD value and number of ports (NOP) value determined for the cell identifier. The MSD value for the cell identifier is the MSD of return loss values of the antenna ports associated with the cell identifier. The number of ports (NOP) value for the cell identifier is the number of flagged antenna ports associated with the cell identifier (e.g., the number of ports with a standard deviation that satisfies the threshold).

If there is only one cell identifier associated with the identified antenna ports for the RET component 120, the server device 130 may assign that cell identifier to the RET component 120. If there is more than one cell identifier associated with the identified antenna ports for the RET component 120, the server device 130 may select the cell identifier with the highest score and assign that cell identifier to the RET component 120. In a case in which multiple cell identifiers with highest scores share a frequency range and correspond to frequency bands that can be duplexed, the server device 130 may assign these multiple cell identifiers to the RET component 120. The server device 130 may map the port identifiers associated with the antenna ports associated with the cell identifier(s) assigned to the RET component 120 to the RET identifier associated with the RET component 120. Alternatively, the server device 130 may map the port identifiers associated with the flagged antenna ports associated with the cell identifier(s) assigned to the RET component 120 to the RET identifier associated with the RET component 120. A process for assigning one or more cellular identifiers to an RET component 120 is described in greater detail below in connection with FIG. 2.

Figure 1H:
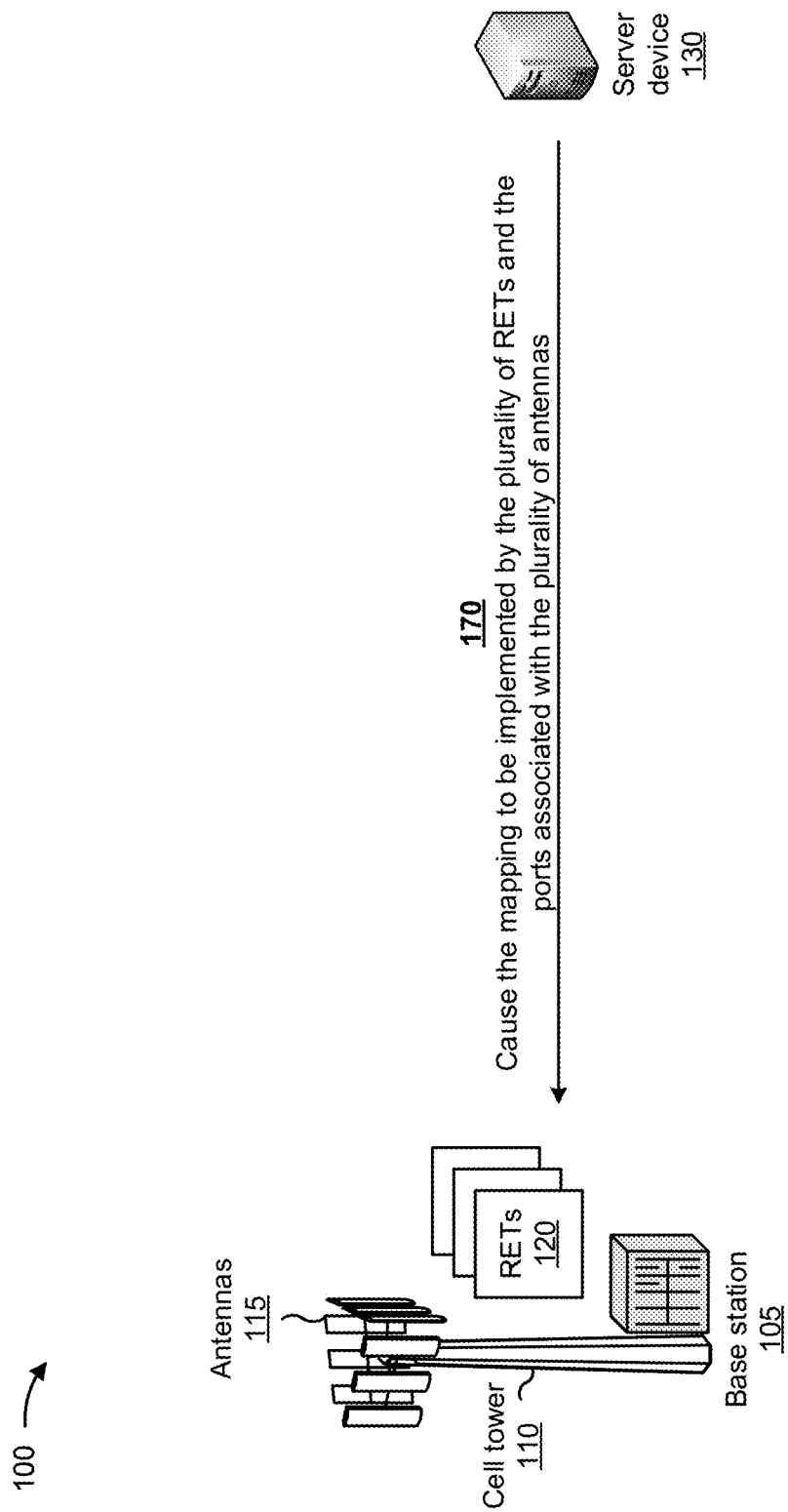

As shown in FIG. 1H, and by reference number 170, the server device 130 may cause the mapping to be implemented by the plurality of RET components 120 and the plurality of antennas 115. The server device 130 may provide the mapping of the RET identifiers associated with the RET components 120 and the port identifiers for the antenna ports associated with the plurality of antennas 115 to the base station 105 and instruct the base station 105 to implement the mapping via the plurality of RET components 120 and the antenna ports associated with the plurality of antennas 115. The server device 130 may instruct the base station 105 to replace any previous mappings for the RET components 120 and the antenna ports with the mapping generated by the server device 130. The server device 130 may instruct the base station 105 to store the mapping and use the mapping to perform optimization of the wireless network provided by the base station 105. In this way, the server device 130 may cause the base station 105 to use a mapping with increased accuracy for optimization of the wireless network, leading to increased network coverage, network reliability, and network speed. In some instances, the return loss measurement and analysis may be regularly scheduled so that mappings can be updated over time to ensure accurate mappings. Furthermore, in this way, the server device 130 may cause the base station 105 to conserve computing resources, networking resources, and/or the like that would otherwise have been consumed to identify incorrect associations between the RET components 120 and the ports associated with the antennas, correct the incorrect associations, and repeat network optimizations.

As indicated above, FIGS. 1A-1H are provided as one or more examples. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
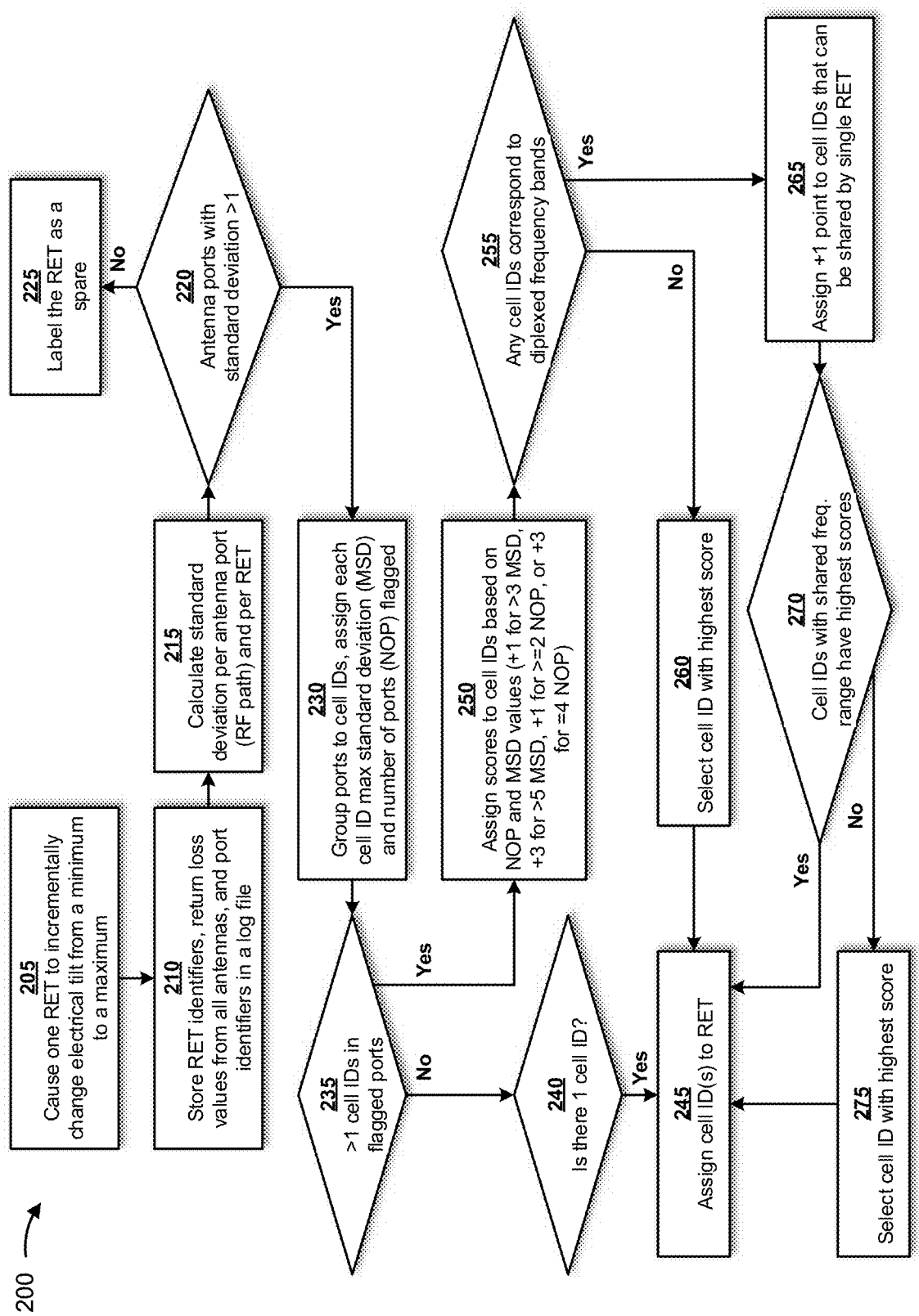
FIG. 2 is a flow chart of an example process relating to mapping a remote electrical tilt component to one or more cell identifier.

FIG. 2 is a flow chart of an example process 200 relating to mapping a remote electrical tilt component to one or more cell identifier. In some implementations, one or more process blocks of FIG. 2 may be performed by a device (e.g., server device 130). In some implementations, one or more process blocks of FIG. 2 may be performed by another device or a group of devices separate from or including the device, such as a base station (e.g., base station 105), and/or the like. Additionally, or alternatively, one or more process blocks of FIG. 2 may be performed by one or more components of a device, such as a processor, memory, storage component, input component, output component, communication component, and/or the like.

As shown in FIG. 2, process 200 may include causing one RET component to incrementally change an electrical tilt from a minimum to a maximum (block 205). For example, the device may cause the RET component to incrementally change the electrical tilt on one or more antennas controlled by the RET component to a plurality of tilt angles between a minimum tilt angle associated with the RET component and a maximum tilt angle associated with the RET component.

As shown in FIG. 2, process 200 may further include storing RET identifiers, return loss values from all antennas, and port identifiers for the antenna ports associated with the antennas in a log file (block 210). For example, the device may receive the return loss values for all of the antenna ports in response to the changes in the electrical tilt controlled by the RET component, and store the return loss values and port identifiers for the antenna ports, as well as the RET identifier of the RET component in a log file.

As shown in FIG. 2, process 200 may further include calculating standard deviation per antenna port (RF path) and per RET (block 215). For example, for each antenna port, the device may read the return loss values for that antenna port from the log file and calculate the standard deviation of the return loss values for that antenna port.

As shown in FIG. 2, process 200 may further include determining whether there are any antenna ports with a standard deviation greater than one (block 220). If there are no antenna ports with a standard deviation greater than one, process 200 proceeds to block 225. If there are one or more antenna ports with a standard deviation greater than one, process 200 proceeds to block 230.

As shown in FIG. 2, process 200 may further include labeling the RET component as a spare (block 225) in response to a determination that there are no antenna ports with a standard deviation greater than one in block 220. For example, when there are no antenna ports with a standard deviation greater than one, the device may determine that the RET component is not in use and assign a label of "spare" or "not in use" to the RET component.

As shown in FIG. 2, process 200 may further include grouping antenna ports to cell identifiers, and assigning each cell identifier MSD and NOP flagged values (block 230). For example, antenna ports with a standard deviation greater than one may be flagged. A cell identifier may have 1, 2, or 4 antenna ports assigned thereto. The device may identify which ports are associated with which cell identifiers. For example, this information may be received from the base station. For each cell identifier, the device may determine an MSD value as the maximum of the standard deviations of the antenna ports assigned to that cell identifier. For each cell identifier, the device may determine a NOP value as the number of antenna ports flagged of the antenna ports assigned to that cell identifier.

As shown in FIG. 2, process 200 may further include determining whether there is more than one cell identifier associated with the flagged antenna ports (block 235). If there is not more than one cell identifier associated with the flagged antenna ports, process 200 proceeds to block 240. If there is more than one cell identifier associated with the flagged antenna ports, process 200 proceeds to block 250.

As shown in FIG. 2, process 200 may further include determining whether there is 1 cell identifier associated with the flagged antenna ports (block 240), in response to a determination that there is not more than one cell identifier associated with the flagged antenna ports in block 235. As shown in FIG. 2, process 200 further includes, in response to a determination that there is 1 cell identifier associated with the flagged antenna ports, assigning the cell identifier to the RET (block 245).

As shown in FIG. 2, process 200 may further include assigning scores to cell identifiers based on the NOP and MSD values (block 250). In response to a determination that there is more than one cell identifier associated with the flagged antenna ports in block 235, the device may assign scores to the cell identifiers associated with the flagged antenna ports based on the MSD and NOP values of the cell identifiers associated with the flagged antenna ports. For example, the device may assign a value of +1 for the score of a cell identifier if the MSD for the cell identifier is greater than 3, or assign a value of +3 for the score of the cell identifier is the MSD for the cell identifier is greater than 5. The device may add +1 to the score of the cell identifier if the NOP value for the cell identifier is greater than or equal to 2, or may add +3 to the score of the cell identifier if the NOP value for the cell identifier is equal to 4.

As shown in FIG. 2, process 200 may further include determining whether any of the cell identifiers associated with the flagged antenna ports correspond to frequency bands that can be diplexed (block 255). Frequency bands that can be diplexed can be shared by a single RET component. If it is determined that the none of the cell identifiers associated with the flagged antenna ports correspond to frequency bands that can be diplexed, process 200 proceeds to block 260. If it is determined that the any of the cell identifiers associated with the flagged antenna ports correspond to frequency bands that can be diplexed, process 200 proceeds to block 265.

As shown in FIG. 2, process 200 may further include, in response to a determination that none of the cell identifiers associated with the flagged antenna ports correspond to frequency bands that can be diplexed in block 255, selecting a cell identifier with the highest score (block 260) and assigning the cell identifier to the RET component (block 245).

As shown in FIG. 2, process 200 may further include, in response to a determination that any of the cell identifiers associated with the flagged antenna ports correspond to frequency bands that can be diplexed in block 255, assigning +1 point to the scores of the cell identifiers that can be shared by a single RET component (block 265). For example, when two cell identifiers correspond to frequency bands that can be diplexed and thus shared by a single RET component, the device may assign +1 point to the respective score of each of those cell identifiers.

As shown in FIG. 2, process 200 may further include determining whether cell identifiers with a shared frequency range have the highest scores (block 270). For example, the device may determine if the two highest scores are associated with two cell identifiers with a shared frequency range (e.g., two cell identifiers corresponding to frequency bands that can be diplexed). In response to a determination that cell identifiers with a shared frequency range do have the highest scores, process 200 proceeds to block 245 and the cell identifiers with the shared frequency range are assigned to the RET component (block 245). In response to a determination that cell identifiers with a shared frequency range do not have the highest scores, process 200 proceeds to block 275.

As shown in FIG. 2, process 200 may further include, in response to a determination that cell identifiers with a shared frequency range do not have the highest scores in block 270, selecting the cell identifier with the highest score (block 275) and assigning the cell identifier to the RET component (block 245).

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
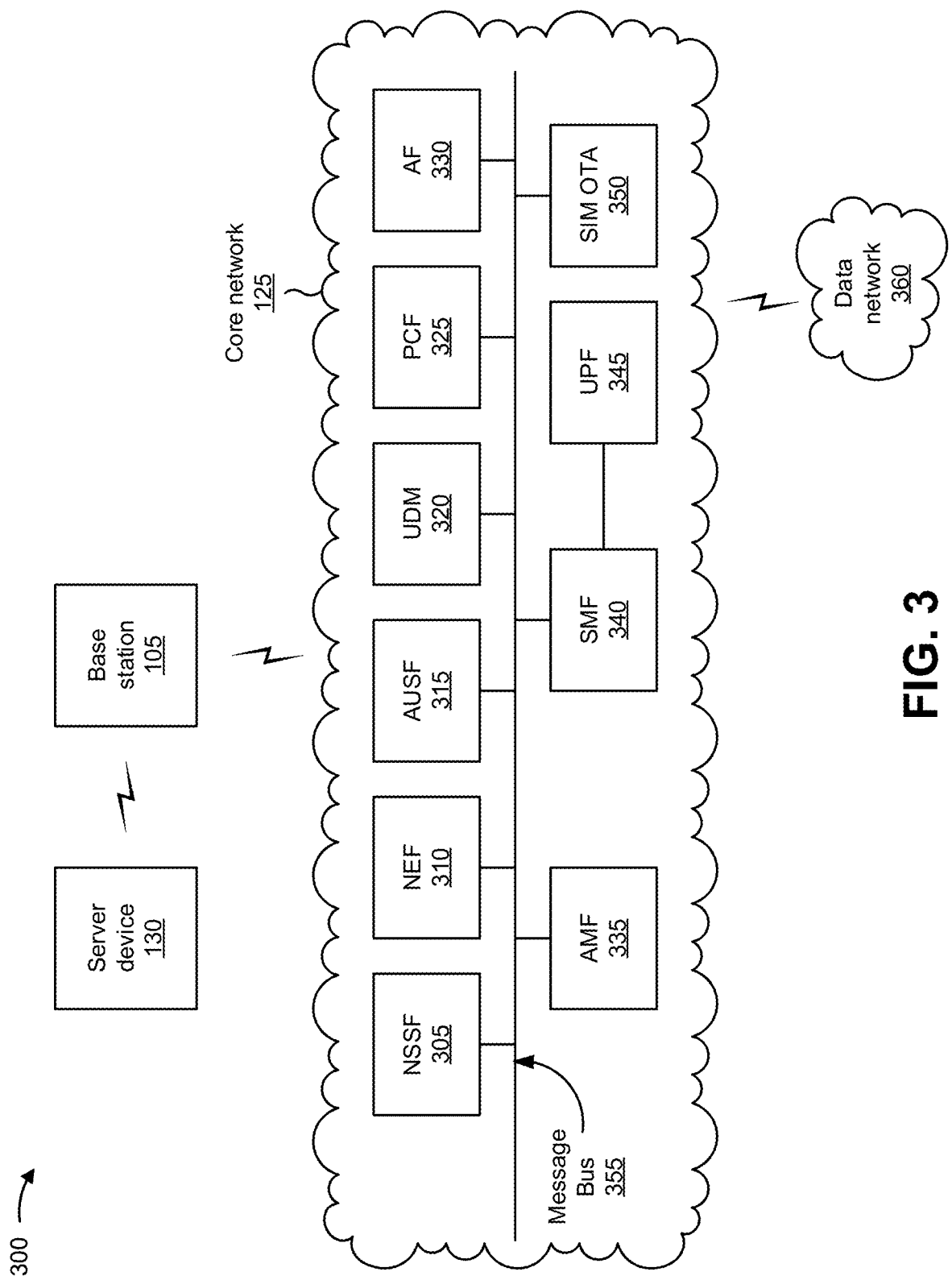
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a server device 130, a base station 105, a core network 125, and a data network 360. Devices and/or networks of example environment 300 may interconnect via wired connections, wireless connections, or a combination of wired and wireless connections.

Server device 130 includes one or more devices capable of receiving, generating, storing, processing, and/or providing information, as described herein. For example, server device 130 may include a laptop computer, a tablet computer, a desktop computer, a group of server devices, or a similar type of device. In some implementations, server device 130 may receive information from and/or transmit information to base station 105.

Base station 105 includes one or more devices capable of communicating with a user device (e.g., a user equipment (UE)) using a cellular radio access technology (RAT). For example, base station 105 can include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 105 can transfer traffic between the user device (e.g., using a cellular RAT), other base stations 105 (e.g., using a wireless interface or a backhaul interface, such as a wired backhaul interface), and/or core network 125. Base station 105 can provide one or more cells that cover geographic areas. Some base stations 105 can be mobile base stations. Some base stations 105 can communicate using multiple RATs.

In some implementations, base station 105 can perform scheduling and/or resource management for user devices covered by base station 105 (e.g., user devices covered by a cell provided by base station 105). In some implementations, base station 105 can be controlled or coordinated by a network controller, which can perform load balancing, network-level configuration, and/or the like. The network controller can communicate with base station 105 via a wireless or wireline backhaul. In some implementations, base station 105 can include a network controller, a self-organizing network (SON) module or component, or a similar module or component. In other words, base station 105 can perform network control, scheduling, and/or network management functions (e.g., for other base stations 105 and/or for uplink, downlink, and/or sidelink communications of user devices covered by the base station 105). In some implementations, base station 105 can include a central unit and multiple distributed units. The central unit can coordinate access control and communication with regard to the multiple distributed units. The multiple distributed units can provide user devices and/or other base stations 105 with access to data network 360 via the core network 125.

In some implementations, core network 125 may include an example functional architecture in which systems and/or methods described herein may be implemented. For example, core network 125 may include an example architecture of a fifth generation (5G) next generation (NG) core network included in a 5G wireless telecommunications system. While the example architecture of core network 125 shown in FIG. 3 may be an example of a service-based architecture, in some implementations, core network 125 may be implemented as a reference-point architecture, a 4G core network, and/or the like.

As shown in FIG. 3, core network 125 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, a user plane function (UPF) 345, a subscriber identity module (SIM) over-the-air (OTA) device 350, and/or the like. These functional elements may be communicatively connected via a message bus 355. Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 305 includes one or more devices that select network slice instances for a user device. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating user devices in the wireless telecommunications system.

UDM 320 includes one or more devices that store user data and profiles in the wireless telecommunications system. UDM 320 may be used for fixed access, mobile access, and/or the like, in core network 125.

PCF 325 includes one or more devices that provide a policy framework that incorporates network slicing, roaming, packet processing, mobility management, and/or the like.

AF 330 includes one or more devices that support application influence on traffic routing, access to NEF 310, policy control, and/or the like.

AMF 335 includes one or more devices that act as a termination point for non-access stratum (NAS) signaling, mobility management, and/or the like.

SMF 340 includes one or more devices that support the establishment, modification, and release of communication sessions in the wireless telecommunications system. For example, SMF 340 may configure traffic steering policies at UPF 345, enforce user equipment IP (Internet Protocol) address allocation and policies, and/or the like.

UPF 345 includes one or more devices that serve as an anchor point for intraRAT and/or interRAT mobility. UPF 345 may apply rules to packets, such as rules pertaining to packet routing, traffic reporting, handling user plane QoS, and/or the like.

SIM OTA device 350 includes one or more devices, such as computing devices and/or server devices, that perform OTA activation and/or OTA updates for a universal integrate circuit card (UICC) installed in a user device. For example, SIM OTA device 350 may authenticate the UICC via an access network provided by base station 105 and/or may provide an assigned telephone number to the UICC. In some implementations, SIM OTA device 350 may provide updates, new information, and/or the like to NSSAI (Network Slice Selection Assistance Information) and/or URSP (UE Route Selection Policy) configurations stored in the UICC of a user device.

Message bus 355 represents a communication structure for communication among the functional elements. In other words, message bus 355 may permit communication between two or more functional elements.

Data network 360 includes one or more wired and/or wireless data networks. For example, data network 360 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
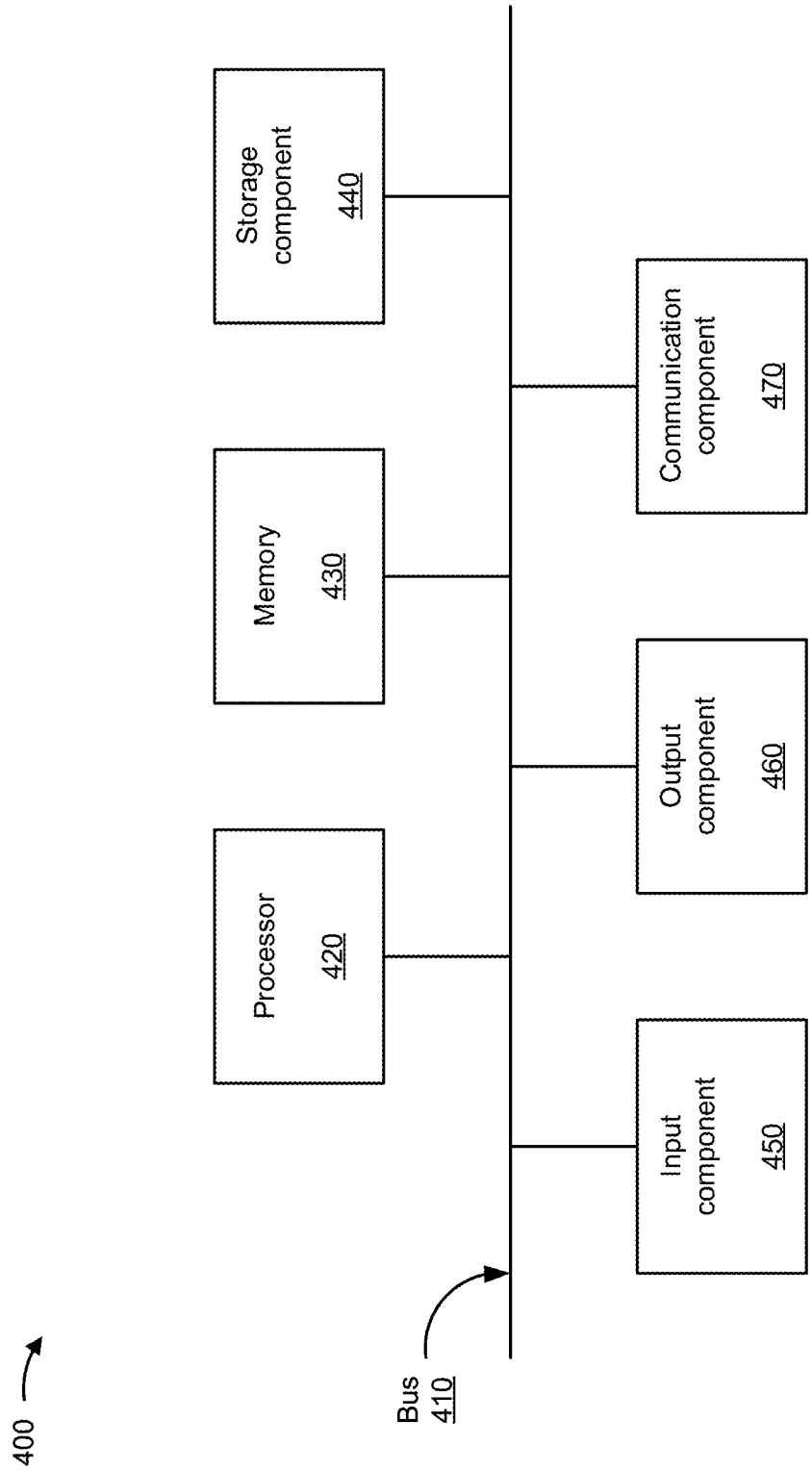
FIG. 4 is a diagram of example components of one or more devices of FIG. 3.

FIG. 4 is a diagram of example components of a device 400, which may correspond to server device 130, base station 105, NSSF 305, NEF 310, AUSF 315, UDM 320, PCF 325, AF 330, AMF 335, SMF 340, UPF 345, and/or SIM OTA device 350. In some implementations, server device 130, base station 105, NSSF 305, NEF 310, AUSF 315, UDM 320, PCF 325, AF 330, AMF 335, SMF 340, UPF 345, and/or SIM OTA device 350 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
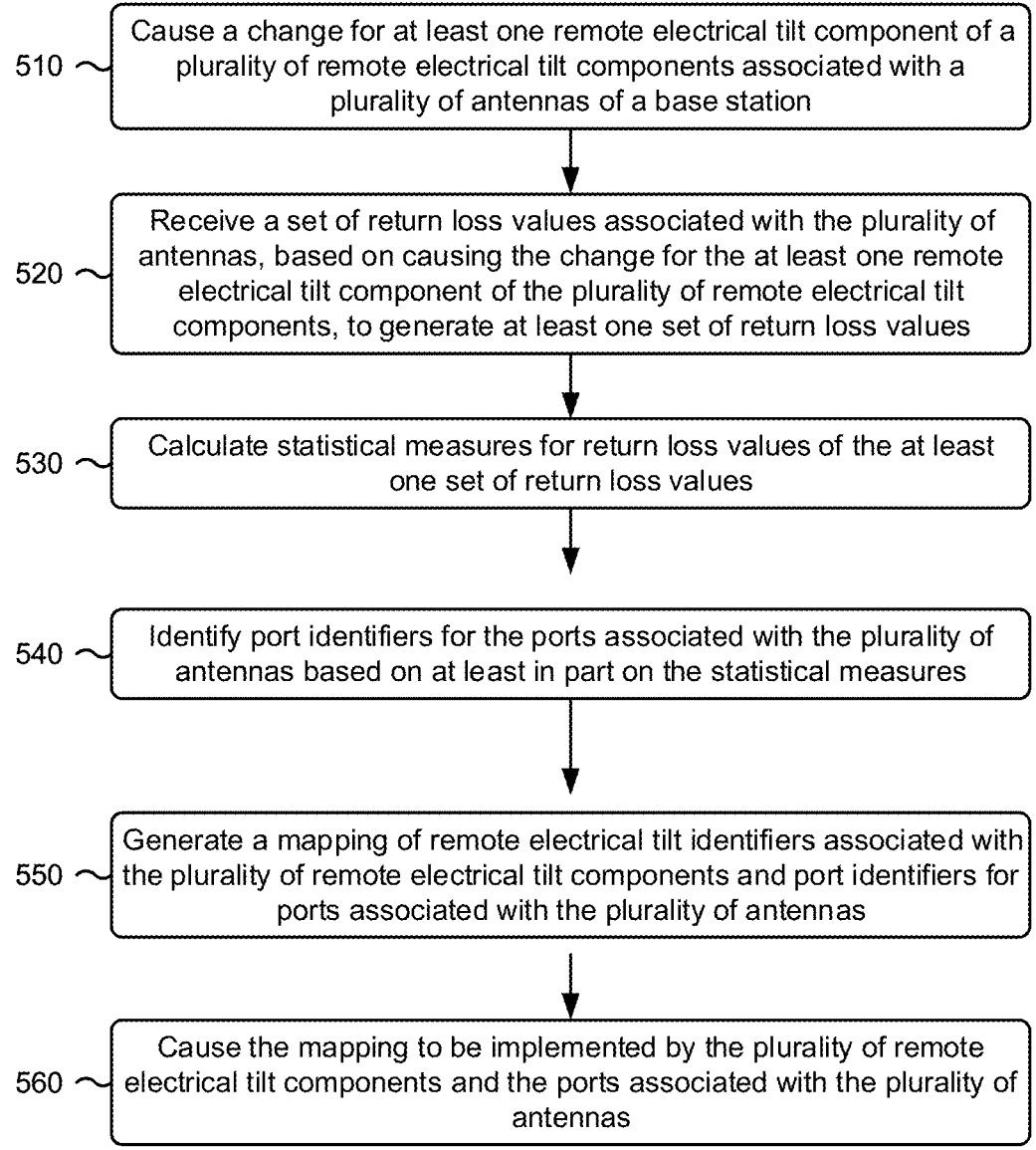
FIG. 5 is a flow chart of an example process relating to mapping remote electrical tilt components and antenna ports of a cellular tower based on return loss associated with antennas of the cellular tower.

FIG. 5 is a flow chart of an example process 500 associated with mapping remote electrical tilt components and antenna ports of a cellular tower based on return loss associated with antennas of the cellular tower. In some implementations, one or more process blocks of FIG. 5 may be performed by a device (e.g., server device 130). In some implementations, one or more process blocks of FIG. 5 may be performed by another device or a group of devices separate from or including the device, such as a base station (e.g., base station 105), an NSSF (e.g., NSSF 305), an SMF (e.g., SMF 340), a UPF (e.g., UPF 345), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include causing a change for at least one remote electrical tilt component of a plurality of remote electrical tilt components associated with a plurality of antennas of a base station (block 510). For example, the device may cause a change for each remote electrical tilt component of a plurality of remote electrical tilt components associated with a plurality of antennas of a base station, as described above. In some implementations, the device may cause each remote electrical tilt component to change a tilt angle of a corresponding one of the plurality of antennas from a minimum tilt angle to a maximum tilt angle.

In some implementations, each of the plurality of remote electrical tilt components controls a tilt angle associated with one of the plurality of antennas. In some implementations, one or more of the plurality of remote electrical tilt components controls tilt angles associated with two or more of the plurality of antennas. The plurality of remote electrical tilt components may be electrically coupled via a daisy chain configuration. In some implementations, the plurality of remote electrical tilt components are controlled via a remote electrical tilt controller associated with the base station.

As further shown in FIG. 5, process 500 may include receiving a set of return loss values associated with the plurality of antennas, based on causing the change for the at least one remote electrical tilt component of the plurality of remote electrical tilt components, to generate at least one set of return loss values (block 520). For example, the device may receive a set of return loss values associated with the plurality of antennas, based on causing the change for each remote electrical tilt component of the plurality of remote electrical tilt components, to generate a plurality of sets of return loss values, as described above.

As further shown in FIG. 5, process 500 may include calculating statistical measures for return loss values of at least one set of return loss values (block 530). For example, the device may calculate statistical measures for return loss values of the plurality of sets of return loss values based on causing the change for each remote electrical tilt component of the plurality of remote electrical tilt components, as described above. In some implementations, calculating the statistical measures may include calculating standard deviations for return loss values of the plurality of sets of return loss values.

As further shown in FIG. 5, process 500 may include identifying port identifiers for the ports associated with the plurality of antennas based at least in part on the statistical measures (block 540). For example, the device may identify port identifiers for the ports associated with the plurality of antennas based on at least in part on comparing the statistical measures (e.g., standard deviations) for the return loss values of the plurality of sets of return loss values with a threshold, as described above.

As further shown in FIG. 5, process 500 may include generating a mapping of remote electrical tilt identifiers associated with the plurality of remote electrical tilt components and port identifiers for ports associated with the plurality of antennas (block 550). For example, the device may generate a mapping of remote electrical tilt identifiers associated with the plurality of remote electrical tilt components and port identifiers for ports associated with the plurality of antennas based on identifying port identifiers for the ports associated with the plurality of antennas, as described above. Each of the plurality of remote electrical tilt components may include a unique remote electrical tilt identifier.

In some implementations, process 500 may include assigning scores to the remote electrical tilt identifiers associated with the plurality of remote electrical tilt components based standard deviations calculated for the return loss values. Generating the mapping may include generating the mapping of the remote electrical tilt identifiers associated with the plurality of remote electrical tilt components and the port identifiers for the ports associated with the plurality of antennas based on assigning scores to the remote electrical tilt identifiers associated with the plurality of remote electrical tilt components.

In some implementations, process 500 may include calculating standard deviations for return loss values of one of the plurality of sets of return loss values associated with a particular remote electrical tilt component; determining that a maximum standard deviation, of the standard deviations, fails to satisfy a threshold; and determining that the particular remote electrical tilt component is not in use based on determining that the maximum standard deviation fails to satisfy the threshold.

In some implementations, the device may store the plurality of sets of return loss values, the remote electrical tilt identifiers associated with the plurality of remote electrical tilt components, and the port identifiers for the ports associated with the plurality of antennas in a log file, and the device may generate the mapping of the remote electrical tilt identifiers associated with the plurality of remote electrical tilt components and the port identifiers for the ports associated with the plurality of antennas based on the log file.

As further shown in FIG. 5, process 500 may include causing the mapping to be implemented by the plurality of remote electrical tilt components and the ports associated with the plurality of antennas (block 560). For example, the device may cause the mapping to be implemented by the plurality of remote electrical tilt components and the ports associated with the plurality of antennas, as described above. For example, the device may provide the mapping to the base station and instruct the base station to implement the mapping via the plurality of remote electrical tilt components and the ports associated with the plurality of antennas.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:
   determining, by a device and based on a return loss value associated with an antenna of a base station, a port identifier for a port associated with the antenna,
      wherein the return loss value is based on a change associated with a tilt component associated with the antenna;
   generating, by the device, a mapping of a tilt identifier, associated with the tilt component, and the port identifier; and
   causing, by the device, the mapping to be implemented by the tilt component and the port.

2. The method of claim 1, further comprising:
   sending instructions to the base station to adjust the tilt component; and
   causing, based on sending the instructions, the change with the tilt component.

3. The method of claim 1, wherein determining the port identifier based on the return loss value comprises:
   calculating a statistical measure for the return loss value; and
   identifying, based on comparing the statistical measure with a threshold, the port identifier.

4. The method of claim 1, wherein the antenna is a first antenna, and
   wherein the method further comprises:
      receiving, based on the change with the tilt component associated with the first antenna, a second return loss value associated with a second antenna; and
      generating another mapping of a plurality of port identifiers associated with a plurality of ports associated with a plurality of antennas,
         wherein the plurality of antennas include the first antenna and the second antenna.

5. The method of claim 1, wherein causing the mapping to be implemented comprises:
   replacing a previous mapping with the mapping.

6. The method of claim 1, wherein determining the port identifier based on the return loss value comprises:
   calculating a standard deviation for the return loss value; and
   generating, based on the standard deviation, the mapping.

7. The method of claim 1, wherein the tilt component is a remote electrical tilt component.

8. A device, comprising:
   one or more processors configured to:
      determine, based on a return loss value associated with an antenna of a base station, a port identifier for a port associated with the antenna,
         wherein the return loss value is based on a change associated with a tilt component associated with the antenna;
      generate a mapping of a tilt identifier, associated with the tilt component, and the port identifier; and
      cause the mapping to be implemented by the tilt component and the port.

9. The device of claim 8, wherein the one or more processors are further configured to:
   send instructions to the base station to adjust the tilt component; and
   cause, based on sending the instructions, the change with the tilt component.

10. The device of claim 8, wherein the one or more processors, to determine the port identifier based on the return loss value, are configured to:
    calculate a statistical measure for the return loss value; and
    identify, based on comparing the statistical measure with a threshold, the port identifier.

11. The device of claim 8, wherein the antenna is a first antenna, and
    wherein the one or more processors are further configured to:
       receive, based on the change with the tilt component associated with the first antenna, a second return loss value associated with a second antenna; and
       generate another mapping of a plurality of port identifiers associated with a plurality of ports associated with a plurality of antennas,
          wherein the plurality of antennas include the first antenna and the second antenna.

12. The device of claim 8, wherein the one or more processors, to cause the mapping to be implemented, are configured to:
    replace a previous mapping with the mapping.

13. The device of claim 8, wherein the one or more processors, to determine the port identifier based on the return loss value, are configured to:
    calculate a standard deviation for the return loss value; and
    generate, based on the standard deviation, the mapping.

14. The device of claim 8, wherein the tilt component is a remote electrical tilt component.

15. A non-transitory computer-readable medium storing a set of instructions, the set of instructions comprising:
    one or more instructions that, when executed by one or more processors of a device, cause the device to:
       determine, based on a return loss value associated with an antenna of a base station, a port identifier for a port associated with the antenna,
          wherein the return loss value is based on a change associated with a tilt component associated with the antenna;
       generate a mapping of a tilt identifier, associated with the tilt component, and the port identifier; and
       cause the mapping to be implemented by the tilt component and the port.

16. The non-transitory computer-readable medium of claim 15, wherein the one or more instructions further cause the device to:
    send instructions to the base station to adjust the tilt component; and
    cause, based on sending the instructions, the change with the tilt component.

17. The non-transitory computer-readable medium of claim 15, wherein the one or more instructions, that cause the device to determine the port identifier based on the return loss value, cause the device to:
    calculate a statistical measure for the return loss value; and
    identify, based on comparing the statistical measure with a threshold, the port identifier.

18. The non-transitory computer-readable medium of claim 15, wherein the one or more instructions, that cause the device to determine the port identifier based on the return loss value, cause the device to:
    calculate a standard deviation for the return loss value; and
    generate, based on the standard deviation, the mapping.

19. The non-transitory computer-readable medium of claim 15, wherein the antenna is a first antenna, and
  wherein the one or more instructions further cause the device to:
    receive, based on the change with the tilt component associated with the first antenna, a second return loss value associated with a second antenna; and
    generate another mapping of a plurality of port identifiers associated with a plurality of ports associated with a plurality of antennas,
      wherein the plurality of antennas include the first antenna and the second antenna.

20. The non-transitory computer-readable medium of claim 15, wherein the one or more instructions, that cause the device to cause the mapping to be implemented, cause the device to:
  replace a previous mapping with the mapping.

\* \* \* \* \*